United States Patent
Moretti

(10) Patent No.: US 6,493,955 B1
(45) Date of Patent: Dec. 17, 2002

(54) INSTRUMENT FOR OBTAINING A REFERENCE LINE

(75) Inventor: Massimo Moretti, Massalombarda (IT)

(73) Assignee: Massino Moretti, Massalombarda (IT)

( * ) Notice: Subject to any disclaimer, the term of this patent is extended or adjusted under 35 U.S.C. 154(b) by 0 days.

(21) Appl. No.: 09/423,202

(22) PCT Filed: May 15, 1998

(86) PCT No.: PCT/IB98/00739

§ 371 (c)(1),
(2), (4) Date: Nov. 3, 1999

(87) PCT Pub. No.: WO98/51994

PCT Pub. Date: Nov. 19, 1998

(30) Foreign Application Priority Data

May 15, 1997 (IT) ........................................ BO97A00293

(51) Int. Cl.[7] .............................................. G01B 11/26
(52) U.S. Cl. .............................. 33/451; 33/286; 33/370; 33/DIG. 21
(58) Field of Search ............................. 33/451, DIG. 21, 33/286, 370, 347, 263, 264, 275 R, 290, 292, 281, 282, 295, 365, 369, 371, 379, 381, 382

(56) References Cited

U.S. PATENT DOCUMENTS

| 280,203 | A | * | 6/1883 | McCurry | 33/290 |
|---|---|---|---|---|---|
| 440,445 | A | * | 11/1890 | Stewart | 33/282 |
| 2,308,206 | A | * | 1/1943 | Poland | 33/290 |
| 2,407,845 | A | * | 9/1946 | Nemeyer | 33/286 |
| 3,997,267 | A | | 12/1976 | Met | |
| 4,160,285 | A | * | 7/1979 | Shibla | 362/145 |
| 5,077,905 | A | * | 1/1992 | Murray, Jr. | 33/DIG. 21 |
| 5,400,514 | A | | 3/1995 | Imbrie et al. | 33/286 |
| 5,487,222 | A | * | 1/1996 | Fairchild | 33/354 |
| 5,531,031 | A | | 7/1996 | Green | 33/286 |
| 5,539,990 | A | * | 7/1996 | Le | 33/281 |
| 5,604,987 | A | * | 2/1997 | Cupp | 33/290 |
| 5,966,826 | A | * | 10/1999 | Ho | 33/290 |
| 5,983,510 | A | * | 11/1999 | Wu et al. | 33/286 |
| 6,151,787 | A | * | 11/2000 | Wright et al. | 33/290 |

FOREIGN PATENT DOCUMENTS

EP 0 617 258 A1 9/1994

* cited by examiner

Primary Examiner—Christopher W. Fulton
(74) Attorney, Agent, or Firm—Fay, Sharpe, Fagan, Minnich & McKee, LLP

(57) ABSTRACT

Instrument for obtaining a reference line to realize, in correspondence of this line, working points, said working points being preferably situated in correspondence of a working surface. The instrument includes: a laser ray emitting device (1), a supporting body (13), connecting means which attach it to a fixed reference surface. These connecting means include a hinge element (2) which enables to orientate the supporting body (13) and direct the laser ray and to keep it fixed in the desired direction in such a way that with the line defined by the laser ray it is possible to find the working points.

19 Claims, 2 Drawing Sheets

INSTRUMENT FOR OBTAINING A REFERENCE LINE

TECHNICAL FIELD

The present invention regards an instrument for obtaining a reference line to realize, relative to this line, working points, said working points being preferably situated on a working surface.

BACKGROUND OF THE INVENTION

Presently, different instruments exist which use the rotation of a laser ray to project a laser ray on a surface. The single illuminous point on the surface is the measuring point.

DISCLOSURE OF THE INVENTION

In EP-A-0 617 258 a portable goniometer of the two pivoting arms type is disclosed. The two arms of this known goniometer are hingedly connected to each other. The first arm has to be freely positioned on a reference surface and the second arm can be oriented in view of the first arm in one plane and between an angle of 0° and 360°. The second arm is provided with a laser ray emitting means permitting the projection of a laser ray in a parallel direction relative to the axis of the second arm. The laser ray reaches points which are not within easy reach for the user. Furthermore, also the angle defined between the laser ray and the reference surface can be measured by this known goniometer.

The instrument hereinafter illustrated is based on a different concept which does not use a ray of light projected on a wall in order to define a single illuminated point of measurement but uses the laser ray to obtain an entire reference line for a plurality of working points.

In the present case the laser ray instrument is fixed, preferably as close as possible to the wall, with a particular fixing system which enables a regulation in order to obtain a real ray of light as a reference line. By the presently shown preferred embodiment of the instrument, it is also possible to cut down sensibly on prices which derive from complicated pivoting systems of the prior art and as it is mounted directly on the reference surface also the tripod support costs are eliminated.

A system is provided which enables to resolve problems which all installers encounter when they have to mount in an aligned way any type of apparatus or structure.

The dependent claims disclose particular and advantageous embodiments of the present invention.

To explain the use of the present system, it is described the practical use of the instrument which hereinafter will be referred to as "laser line".

DESCRIPTION OF THE DRAWINGS

The preferred embodiment of the instrument and its preferred use are here described with reference to the enclosed drawings in which.

DESCRIPTION OF THE ILLUSTRATIVE EMBODIMENT

Supposing that an electrician has to mount an external tube along a wall in order to be able to feed an electric socket, he has to make several holes and mount the attachments in order to sustain the tube, and lastly mount the box which houses the socket; everything correctly lined up.

Previously, it was necessary to carry out different measurements from different points of reference and make a lot of signs on the wall where the holes have to be made.

Otherwise, according to the present "laser line" it is only necessary to make a first hole, mount the first stopper and fix the "laser line" on it. The instrument can thereafter be directed in the desired direction, with the emitted laser ray which define a line in correspondence of which working points can be found.

Figure 2C:
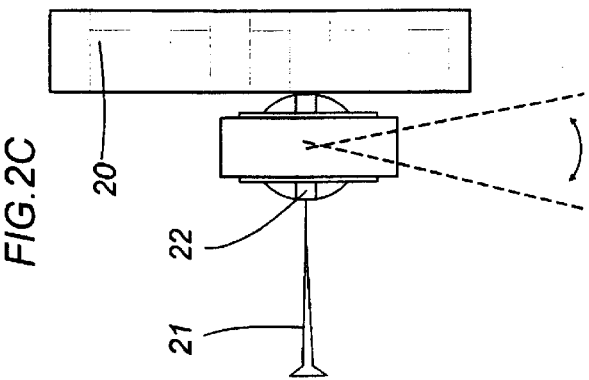
FIGS. 2A, 2B, 2C are views of the present instrument in working conditions.
Figure 2B:
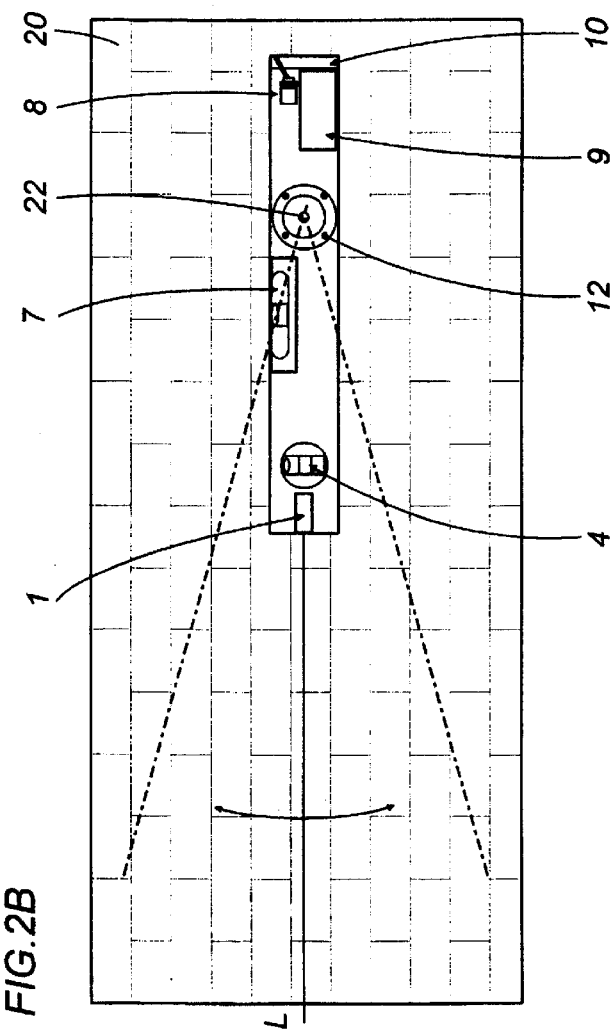
Figure 2A:
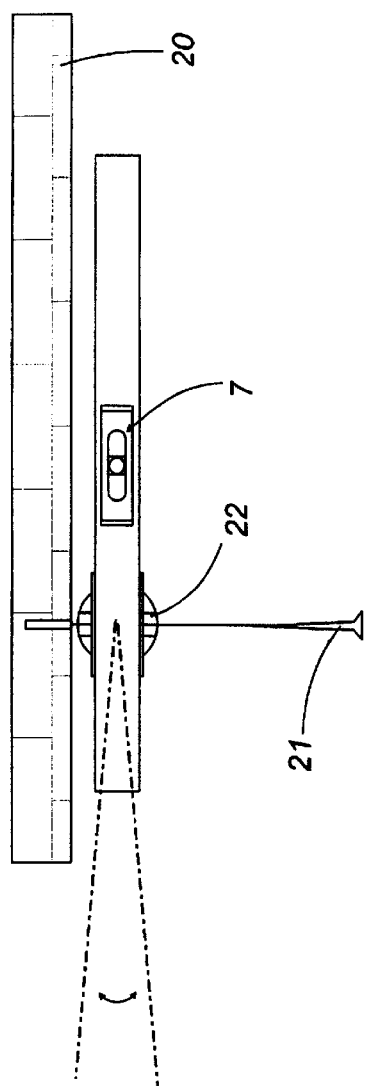

By the present particular system, as illustrated in FIGS. 2A, 2B, 2C, it is possible to direct the laser ray L in the desired direction, and eventually towards a point which is intended to be reached, while simultaneously keeping the ray close to (and when needed eventually parallel) the wall or working surface 20. On this wall 20 it is possible to make holes or other signs of reference, by the user of the present instrument just in correspondence of the line defined by the laser ray. The laser ray should be kept at a few centimeters from the reference surface 20.

By this it is easy to obtain aligned working holes as the point of the drill or other instrument is illuminated by the laser ray and this means that everything is perfectly aligned.

When drilling, it is also possible to keep the position of the point under control avoiding the usual inconvenience of the drill moving at the beginning of said operation.

All of this enables a remarkable saving of time and a precise mounting. The system has been provided with two water levels 7, 4, in order to direct the ray in a parallel or perpendicular way with regard to the ground.

Figures 1A, 1B:
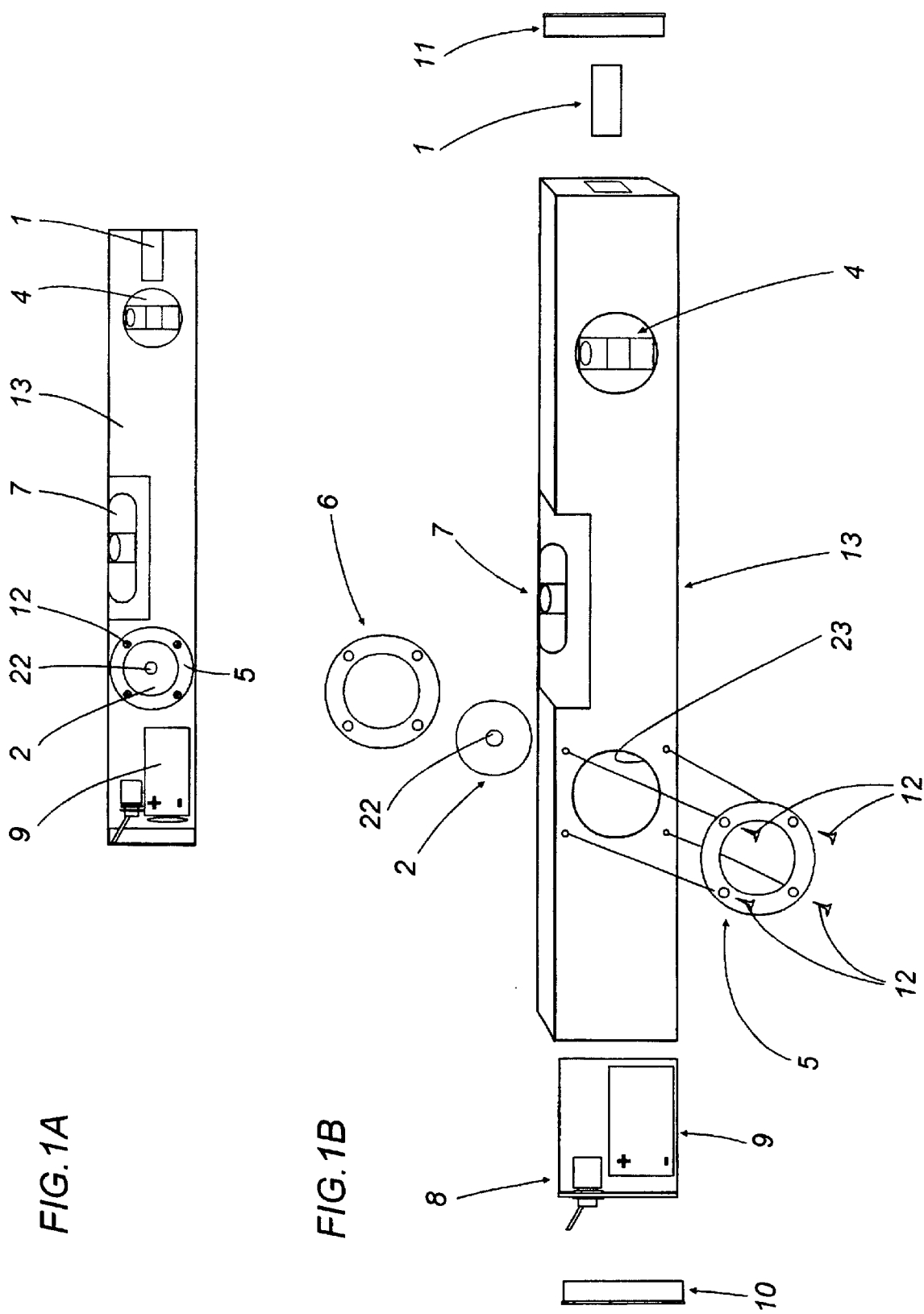
FIG. 1A is a side view of a preferable embodiment of the present invention.
FIG. 1B is an exploded view of the present instrument.

More in detail, as illustrated in FIGS. 1A and 1B, an aluminum bar 13 is the supporting body of the laser emitting device 1, on which also the two water levels 7 and 4 are mounted. Said levels provide or stabilize the perpendicularity or parallelism with respect to the ground of the ray of light emitted from the laser emitting device 1 or laser diode.

As it is evident from the figures, said laser ray has a virtual origin from the center of the hinge ball 2 defining the hinge. In fact, the center of this hinge ball 2 is aligned with the ray emitted from the laser device 1.

The ball or sphere 2 enables the connecting of the supporting body 13 of the device 1 emitting the ray of light to a fixed reference surface (in this case the wall 20) providing a hinge element which enables, as illustrated by the dotted lines in FIGS. 2A, 2B, 2C to direct a laser ray substantially in all spatial directions.

The connecting hinge 2 enables to orientate and maintain orientated the supporting body 13 in order to direct the laser ray and to keep the states direction fixed, so that to trace, by the laser ray, the reference line along which the working points can be found.

The laser device 1 is mounted on the supporting body 13 (by a two-component resin). The device comprises also a lens which focuses the laser ray emitted by the laser diode. A miniature battery feeding system 9 is provided for feeding the laser emitting device.

Logically, the resin will be introduced only after a careful regulation of the position of the laser system.

The hingedly connecting ball 2 is inserted in the supporting body in respect of which it is mobile with friction, due to the fact that it is held in a cavity 23 of the supporting body 13 by suitable means defined by two bushes or washers in nylon (6 and 5) opposite each other.

The bushes or washers (6 and 5) are fixed to the supporting body 13 of the instrument by means of connecting screws 12, or in other suitable ways.

The supporting body 13 can be attached to the fixed reference by means of the hinge element or ball 2 with any kind of fixation means. Pivoting means are provided for connection of the hinge element to the fixed reference.

The pivoting means have in the center of the hinge or ball 2 a hole 22 in which a fixation screw 21, or other fixation device, is inserted, in such a way to attach the present instrument to the fixed surface (in this case the wall 20).

The ball 2 is free to rotate in all positions and spatial directions, or only in a plane if desired, and is held with friction by the two bushes and cavity 23. This allows a user to direct and regulate the direction of the laser ray in substantially all the spatial, or planar, directions desired.

The switch 8 is inside the body of the laser line in such a way that it cannot be accidentally operated. The batteries 9 are two normal 1,5 volt ones and the taps 10 and 11 close the instrument at the ends of the body 13. As shown, the hinge element 2 is provided in the vicinity of one end of the support body.

What is claimed is:

1. An instrument for obtaining a reference line in order to identify working points relative to said reference line, said instrument comprising:
   a device (1) for emitting a ray of laser light;
   a supporting body (13) for said laser light emitting device (1);
   means (2, 22) for connecting the supporting body (13) of the laser emitting device (1) to a reference surface (20), said means (2, 22) for connecting comprising a hinge means (2) which enables orientation of the supporting body (13) such that the ray of laser light is directed in desired directions and so that the ray of laser light is adapted to trace a reference line along which a plurality of working points can be identified on the reference surface (20), said hinge means (2) adapted to receive an associated fastener to fixedly secure said hinge means to the reference surface, wherein said supporting body (13) is movable relative to the reference surface in different directions along at least two different planes.

2. The instrument according to claim 1, wherein said hinge means comprise a ball (2) on which said supporting body (13) is mobile with friction.

3. The instrument according to the claim 2, wherein the supporting body (13) defines a cavity (23) that receives the ball (2), and wherein said instrument further comprises:
   means for holding the ball (2) with friction inside the cavity (23) in the supporting body (13).

4. The instrument according to claim 2 wherein said means for connecting the supporting body to the reference surface comprise pivoting means for attaching the hinge means (2) pivotably to the reference surface (20).

5. The instrument according to claim 1, wherein a center of rotation of the hinge means is substantially aligned with the laser ray emitted by the laser emitting device (1).

6. The instrument according to the claim 5, wherein the supporting body (13) defines a cavity (23) that receives the ball (2), and wherein said instrument further comprises:
   means for holding the ball (2) with friction inside the cavity (23) in the supporting body (13).

7. The instrument according to claim 1, wherein said connecting means are adapted to enable direction of the laser ray at a close distance spaced from the working surface (20) on which the plurality of working points are to be identified.

8. The instrument according to the claim 7, wherein the supporting body (13) defines a cavity (23) that receives the ball (2), and wherein said instrument further comprises:
   means for holding the ball (2) with friction inside the cavity (23) in the supporting body (13).

9. The instrument according to the claim 1, wherein the supporting body (13) defines a cavity (23) that receives the ball (2), and wherein said instrument further comprises:
   means for holding the ball (2) with friction inside the cavity (23) in the supporting body (13).

10. The instrument according to claim 9, wherein the means for holding the ball (2) comprise two bushings (5, 6) which are located opposite each other, said bushings (5, 6) being fixed to the body in adjacent the cavity (23) and enclosing the ball (2).

11. The instrument according to claim 1 wherein said means for connecting the supporting body to the reference surface comprise pivoting means for attaching the hinge means (2) pivotably to the reference surface (20).

12. The instrument according to claim 11, characterized in that the pivoting means comprise a central hole (22) defined in the hinge means (2) in order to receive suitable attachment means which attach the instrument to the reference surface (20).

13. The instrument according to claim 12, wherein said attachment (means comprise a pivoting element (21) which is inserted into the central hole (22) of the hinge means (2) and is attachable to the reference surface.

14. The instrument according to claim 1, wherein said hinge means (2) is situated in the vicinity of one end of the supporting body (13).

15. The instrument according to claim 1, further comprising:
   means (7, 4) for orientating the ray emitting device (1) in a desired direction.

16. The instrument according to claim 15, wherein said means for orientating the ray emitting device in a desired direction comprises at least one liquid level (7, 4) attached to the supporting body (13) in order to draw out at least one of a horizontal line and a vertical line with said ray emitting device.

17. The instrument according to claim 1, further comprising:
   batteries (9) for energying the laser emitting device (1); and,
   an on/off switch (8) for selectively electrically connecting the batteries to the laser emitting device.

18. The instrument according to claim 1, wherein said hinge means comprise means for orientating the laser ray in spatial direction.

19. An instrument for obtaining a reference line in order to identify working points relative to said reference line, said instrument comprising:
   a device (1) for emitting a ray of laser light;
   a supporting body (13) for said laser light emitting device (1);
   means (2, 22) for connecting the supporting body (13) of the laser emitting device (1) to a reference surface (20),said means (2, 22) for connecting comprising a hinge means (2) which enables orientation of the supporting body (13) such that the ray of laser light is directed in desired directions and so that the ray of laser light is adapted to trace a reference line along which a plurality of working points can be identified on the surface (20), said hinge means (2) provided with a hole (22) in which a fixation device (21) is insertable for fixing the supporting body (13) on the reference surface (20).

* * * * *